(12) United States Patent
Kouno et al.

(10) Patent No.: US 6,199,750 B1
(45) Date of Patent: Mar. 13, 2001

(54) METHOD OF MANUFACTURING CORE OF HEAT EXCHANGER

(75) Inventors: Makoto Kouno; Ryoji Matsunami; Tatsuya Fujiyoshi, all of Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 09/362,028

(22) Filed: Jul. 28, 1999

(30) Foreign Application Priority Data

Aug. 25, 1998 (JP) .................................................. 10-239171
Aug. 25, 1998 (JP) .................................................. 10-239175

(51) Int. Cl.[7] .............................. B23K 31/02; B23K 1/20
(52) U.S. Cl. ......................... 228/183; 228/175; 228/217; 228/223
(58) Field of Search ................................... 228/183, 223, 228/175, 217

(56) References Cited

U.S. PATENT DOCUMENTS

| | | | |
|---|---|---|---|
| Re. 35,098 | * 11/1995 | Saperstein | 29/890.043 |
| 4,817,857 | 4/1989 | Hargrove et al. | 228/183 |
| 4,906,307 | 3/1990 | Fujiyoshi | 148/26 |
| 5,102,032 | * 4/1992 | Cottone et al. | 228/183 |
| 5,150,520 | 9/1992 | DeRISI | 29/890.013 |
| 5,251,374 | * 10/1993 | Halstead et al. | 29/890.047 |
| 5,762,132 | * 6/1998 | Evans et al. | 165/133 |
| 5,950,713 | * 9/1999 | Kato | 165/76 |
| 6,026,569 | * 2/2000 | Evans et al. | 29/890.054 |
| 6,036,083 | * 3/2000 | Luo et al. | 228/223 |

FOREIGN PATENT DOCUMENTS

| | | |
|---|---|---|
| 2017761 | 10/1979 | (GB) . |
| 1-143794 | 6/1989 | (JP) . |
| 3-275272 | 12/1991 | (JP) . |
| 4-98367 | 8/1992 | (JP) . |
| 4-288493 | 10/1992 | (JP) . |
| 4-322896 | 11/1992 | (JP) . |
| 4-351267 | 12/1992 | (JP) . |
| 5-277723 | 10/1993 | (JP) . |
| 95/08403 | 3/1995 | (WO) . |

* cited by examiner

Primary Examiner—Patrick Ryan
Assistant Examiner—Zidia T. Pittman
(74) Attorney, Agent, or Firm—Foley & Lardner

(57) ABSTRACT

The top peaks of the outer fin are coated with slime-like flux. A sandwich unit is assembled from the outer fin and the tube plates by attaching the tube plates to the respective sides of the outer fin such that the surfaces of the tube plates having the butt bead faces formed thereon face inward. The butt bead faces on the respective tube plates on either side of the sandwich unit are coated with the slime-like flux. A plurality of sandwich units whose tube plates are coated with the flux are laminated and brazed, and the thus-formed assembly is heated in a heating furnace, to thereby braze together the tube plate pairs and the tube plates connected to the outer fin.

5 Claims, 7 Drawing Sheets

METHOD OF MANUFACTURING CORE OF HEAT EXCHANGER

BACKGROUND OF THE INVENTION

1. Field of the Invention

The present invention relates to a method of manufacturing a core of a heat exchanger for use with a heat exchanger employed in an automobile, such as a condenser, an evaporator, a heater core, or a radiator.

The present application is based on Japanese Patent Applications No. Hei. 10-239171 and 10-239175, which are incorporated herein by reference.

2. Description of the Related Art

A core of a heat exchanger, such as an evaporator, is constituted by arranging in an alternating manner a plurality of corrugated outer fins made of aluminum material and a plurality of flat tubes made of aluminum material. Each of the tubes is formed by bead-butting two tube plates and brazing the thus-butted plates.

The core is usually manufactured as follows: First, slime-like flux comprising, as dispersion medium, polybutene such as that described in, e.g., Japanese Patent Publication No. Hei. 4-322896, is applied to the entirety of the surfaces of the two tube plates constituting the tube. The two tube plates are assembled into a tube while their internal surfaces become mutually opposed. The flux-coated tubes and the outer fines are arranged one by one. The tubes and outer fines, which are arranged alternately, are heated in a heating furnace, to thereby sublime the dispersion medium of flux and activate and fuse brazing filler metal. As a result, the tubes, each being assembled from the tube plates, are brazed together, and the tube plates connected to the top peaks of the corrugated outer fin are brazed, to thereby constitute the core.

As mentioned above, slime-like flux is sprayed onto the entirety of the surfaces of each tube plate, to thereby wastefully consume flux and disadvantageously add to cost.

After the respective tube plates have been coated with flux, two tube plates are assembled to a tube, and an outer fin is connected to each side of the tube. In this way, the tubes and the outer fins are arranged in an alternate manner. Assembly of the tube plates into the single tube and arrangement of the tubes and the outer fins are performed continuously, thus deteriorating working efficiency. Further, if a worker touches the flux-coated surface of the tube plate during the operation, the flux may be disadvantageously scraped away from the surface.

SUMMARY OF THE INVENTION

Accordingly, an object of the present invention is to provide a method of manufacturing a core of a heat exchanger which enables manufacture of a core at reduced cost by eliminating waste of flux, improvements in the efficiency of stacking operation, and eliminating scraping of flux from the tube plate.

According to the present invention, there is provided a heat exchanger core manufacturing method of alternately arranging and brazing together a plurality of corrugated outer fins formed from aluminum material and a plurality of flat tubes, wherein each of the flat tubes is formed by assembly of two tube plates and by brazing butt bead faces provided on the respective tube plates. In the method, the top peaks of the outer fin are coated with slime-like flux, and a sandwich unit is assembled from the outer fin and the tube plates by attaching the tube plates to the respective sides of the outer fin such that the surfaces of the tube plates having the butt bead faces formed thereon face inward. The butt bead faces on the respective tube plates on either side of the sandwich unit is coated with the slime-like flux. A plurality of sandwich units whose tube plates are coated with the flux are stacked into a layer, and the assembly is heated in a heating furnace, to thereby braze together the tube plate pairs and the tube plates connected to the outer fin.

Preferably, of the outer fin and the tube plates only the tube plates are formed from clad material whose surface is coated with a layer of brazing filler metal.

The method for manufacturing a core of a heat exchanger according to the present invention involves application of the slime-like flux to solely the top peaks of the corrugated outer fins and the butt bead faces on the respective tube plates. The areas other than those required to be brazed are not coated with the flux, thus eliminating waste of the flux and advantageous manufacture of the core at reduced cost.

In a process before the process for forming the sandwich unit from the outer fin and the tube plates, the flux is not applied to the tube plates, and hence the tube plates can be handled easily. Even after assembly of the sandwich unit, the surfaces of the respective tube plates on either side of the sandwich unit are not coated with the flux. Hence, the sandwich unit can be handled easily, and there can be prevented staining of surrounding facilities, which would otherwise be caused by the flux.

The butt bead faces on the respective tube plates of the sandwich unit are coated with the slime-like flux, and the sandwich units are stacked in a layer. There is little chance of the worker touching the flux-coated surfaces of the tube plates on either side of the sandwich unit, thus preventing scraping off of the flux adhering to the tube plates.

Further, as mentioned above, once the sandwich unit has been constituted of the outer fin and the tube plates, the tube plates on respective sides of the sandwich unit are coated with flux. So long as the sandwich units are stacked one after another, a core can be constituted by stacking the outer fins and the coolant tubes in an alternating manner, thus improving the efficiency of staking operation and productivity.

Of the outer fin and the tube plates, only the tube plates are formed from clad material, thus realizing further cost reduction, thus enabling manufacture of a core of a heat exchanger at reduced cost.

Features and advantages of the invention will be evident from the following detailed description of the preferred embodiments described in conjunction with the attached drawings.

DETAILED DESCRIPTION OF THE PREFERRED EMBODIMENTS

One embodiment of the present invention will now be described in detail by reference to the accompanying drawings.

Figure 5:
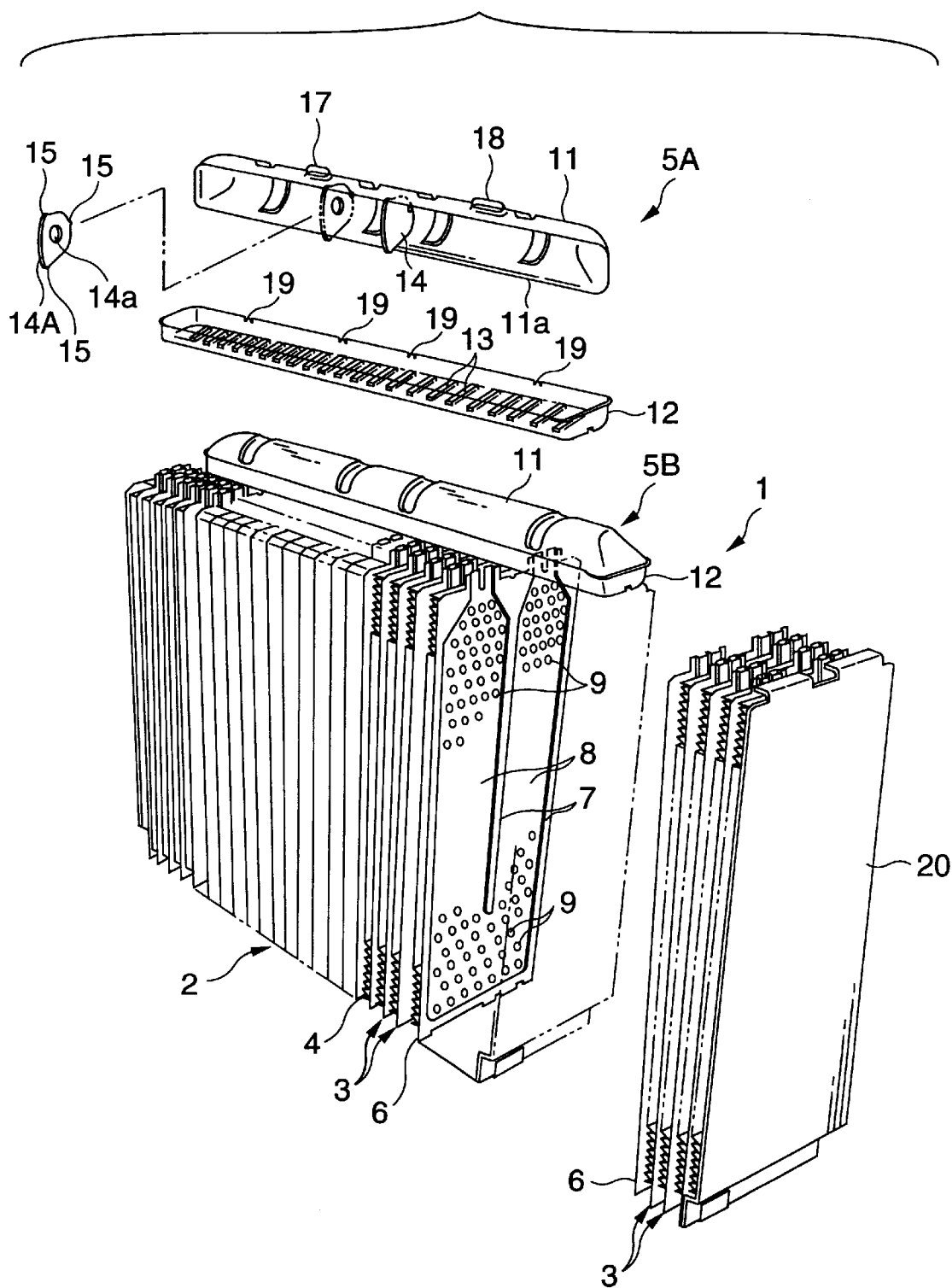
FIG. 5 is a perspective exploded view showing one example of the heat exchanger.

FIG. 5 shows an evaporator 1 employed as a heat exchanger in an air conditioning system for automobile use.

The evaporator 1 comprises a core 2 and a pair of tanks 5A and 5B provided on one side of the core 2. The core 2 is constituted by arranging in an alternating manner a plurality of flat coolant tubes 3 and a plurality of corrugated outer fins 4.

Each of the coolant tubes 3 is formed by assembling two tube plates 6, 6. In each of the tube plates 6, a land section 7 (i.e., a butt bead face) serving as a region to be brazed is formed projectingly so as to extend from the periphery on one side to the center of the tube plate 6. The land sections 7, 7 are butt-welded while being mutually opposed, to thereby constitute a U-shaped coolant channel 8 for inducing a turn flow within the coolant tube 3.

In each of the tube plates 6, a plurality of dimples 9 (i.e., butt bead faces) are formed in the area other than the land section 7; i.e., the surface constituting the coolant channel 8, so as to protrude in the same direction as that in which the land section 7 projects. The top peaks of the dimples 9 on one tube plate 6 are brought into brazed contact with the top peaks of the dimples on the other tube plate 6. The dimples 9 contribute to an increase in the distance over which a coolant travels while flowing through the coolant channel 8, an increase in the surface area of the coolant tube 3, and strengthening of rigidity of the coolant tube 3.

Each of the tanks 5A and 5B comprises a tank body 11 having a substantially semi-circular cross section and a seat plate 12 which is formed into a flat pan and is fitted to an opening edge 11a of the tank body 11.

Tube insertion holes 13 are formed in the seat plate 12 at uniform intervals in a lengthwise direction. Each of the tube insertion holes 13 formed in the seat plate 12 of the tank 5A is press-fitted to one of two open edges of the respective coolant channels 8 of the respective coolant tubes 3. Each of the tube insertion holes 13 formed in the seat plate 12 of the tank 5B is press-fitted to the remaining one of two open edges of the respective coolant channels 8 of the respective coolant tubes 3.

A partition plate 14 is provided in the tank 5A in order to separate the interior of the tank 5A into two compartments.

The partition plate 14 is formed so as to assume the same shape as the cross section of the tank 5A. The partition plate 14 is provided with three projecting locate tabs 15 at three positions; for example, at a center of the semi-circular periphery and at respective junctions between the semi-circular periphery and the flat portion. The locate tabs 15 are fixedly fitted into respective locate holes (not shown) formed in the tank body 11.

One of the two compartments formed by the partition plate 14 in the tank body 5A is provided with a coolant inlet port 17 formed in the peripheral wall surface of the tank body 11 and serves as a coolant inflow chamber. The other compartment is provided with a coolant outlet port 18 formed in the peripheral wall surface of the tank body 11 and serves as a coolant outlet chamber.

As in the case of the partition plate 14, a partition plate 14A for the purpose of regulating a flow rate is fixedly provided in the coolant inflow chamber, and a through hole 14a is formed at the center of the partition plate 14A.

The tank body 11 and the seat plate 12 of the tank 5A, the tank body 11 and the seat plate 12 of the tank 5B, and the partition plates 14 and 14A are fixed by brazing. In order to prevent the tank body 11 from being removed from the seat plate 12 before brazing, a plurality of lugs 19 formed along the flange edge of the seat plate 12 are engaged with the outer periphery surface of the tank body 11. Further, several points along a joint between the tank body 11 and the seat plate 12 are welded for temporarily fixing.

The coolant tubes 3, that is, the tube plates 6, 6, and the outer fins 4, both constituting the core 2, are formed from aluminum or aluminum material such as an aluminum alloy. Each of the tube plates 6, 6 is formed from clad material through pressing, wherein the clad material comprises aluminum material and a layer of brazing filler metal which is formed from metal of the same family as aluminum and is laid on the surface of the aluminum material.

Figure 1A:
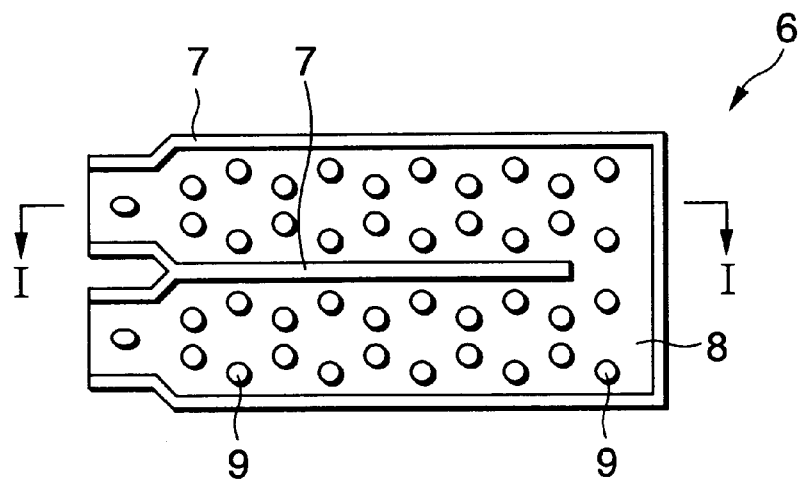
FIG. 1A shows a plan view of a tube plate.
Figure 1B:
FIG. 1B shows a side sectional view of the tube plate taken along line I—I in FIG. 1A.

FIG. 1A shows a plan view of the tube plate 6, and FIG. 1B shows a side sectional view of the tube plate 6 taken along line I—I in FIG. 1A.

Figure 2:
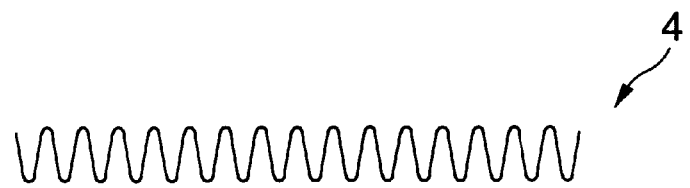
FIG. 2 shows a side view of the corrugated outer fin.

FIG. 2 shows a side view of the corrugated outer fin 4.

Processes for manufacturing the core 2 are now described by reference to FIGS. 3A to 3D.

Figure 3A:
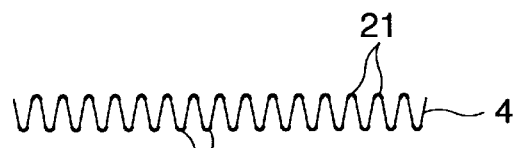
FIGS. 3A to 3D are descriptive views showing a method of manufacturing a core of a heat exchanger according to the present invention.
Figure 4:
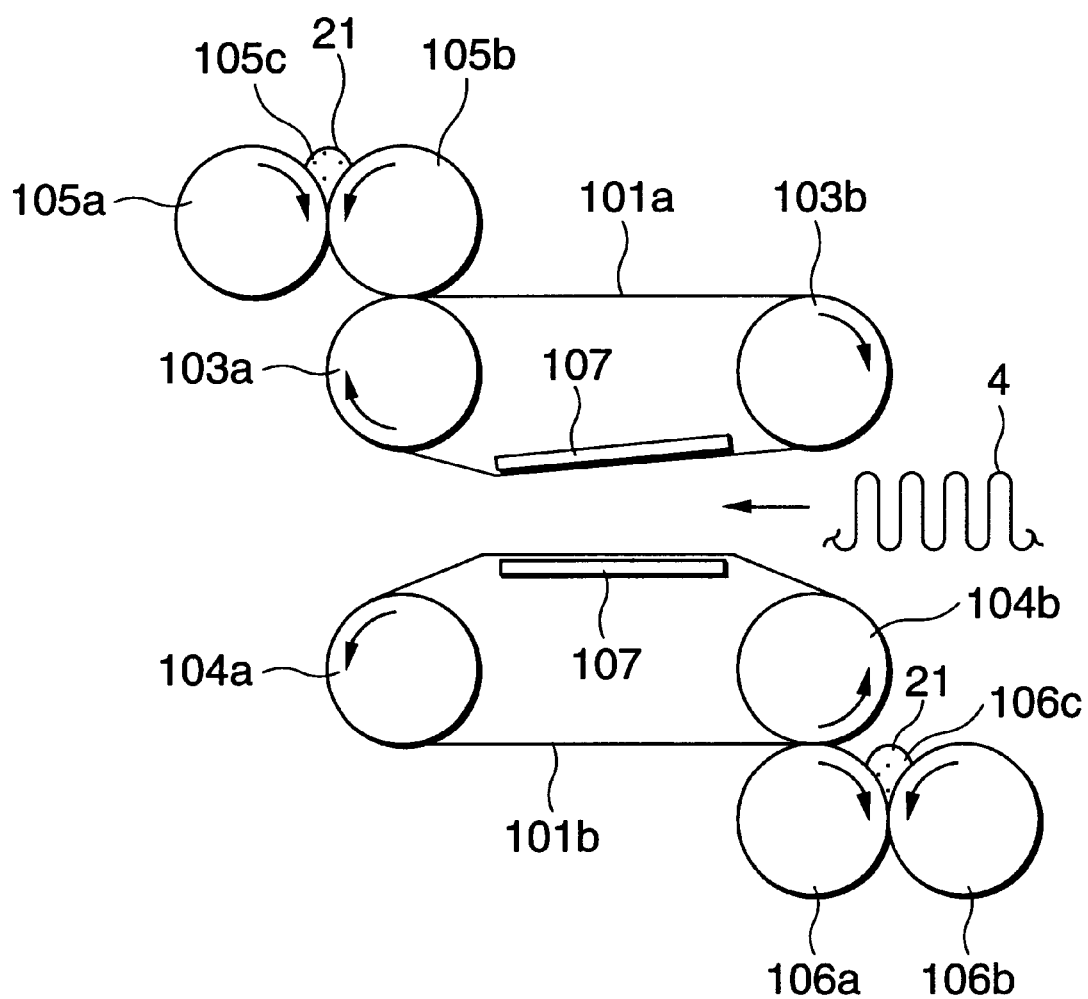
FIG. 4 is a schematic diagram showing a coating apparatus for effecting a method of applying flux for use in brazing aluminum material.

As shown in FIG. 3A, the top peaks of the corrugated outer fin 4 are coated with slime-like flux 21 through use of a coating apparatus as shown in FIG. 4.

The coating apparatus substantially comprises a pair of guide rollers 103a and 103b; an endless coating belt 101a extending between the guide rollers 103a and 103b; another pair of guide rollers 104a and 104b which are located below and are made opposed to the guide rollers 103a and 103b; an endless coating belt 101b extending between the guide rollers 104a and 104b; a pair of feed rollers 105a and 105b provided above the guide roller 103a; a pair of feed rollers 106a and 106b provided below the guide roller 104b; and a pair of height control plates 107, 107 for controlling the clearance between the coating belts 101a and 101b, with one plate thereof being disposed within the coating belt 101a so as to push the coating belt 101a toward the coating belt 101b and the other plate being disposed within the coating belt 101b so as to push the coating belt 101b toward the coating belt 101a.

In the coating apparatus, as shown in FIG. 4, the guide roller pairs 103a, 103b and 104a, 104b and the feed roller pairs 105a, 105b and 106a, 106b are rotated in the directions designated by arrow shown in FIG. 4. As a result, the coating belts 101a and 101b travel in the same direction, and the slime-like flux 21 inserted into inlet sections 105c and 106c is formed into a thin layer on the surface of the feed rollers 105b and 106a. The thin layer formed on the feed roller 105b is transferred to the coating belt 101a which undergoes rotation, and the thin layer formed on the feed roller 106a is transferred to the coating belt 101b which undergoes rotation. Aluminum material (the fin 4 of the heat exchanger) is conveyed through the clearance between the coating belts 101a and 101b, to thereby transfer the slime-like flux 21 to the respective upper and lower surfaces of the aluminum material. In this coating apparatus, in a case where the slime-like flux 21 is applied to solely either the upper or lower surface of aluminum material, the slime-like flux 21 is fed to a corresponding inlet section of one of the inlet sections 105c and 106c.

Under the coating method according to the present invention, in which the slime-like flux 21 is transferred from the coating belts 101a and 101b to the surface of aluminum material, the coating material is inevitably applied to the top peaks of corrugated aluminum material which are to be brought into contact with another aluminum material at the time of assembly. Consequently, flux can be applied to only the areas requiring coating.

The slime-like flux 21 is formed by uniformly dispersing or mixing fluoride-based flux consisting of 65.6 to 99.9% $KAlF_4$ and 34.4 to 0.1% $K_3AlF_6$ into synthetic resin—which has fluidity at room temperature and sublimes at a temperature lower than brazing temperature—so as to constitute 40 to 70 wt. % of the flux 40.

Fluoride-based flux which is commercially available under the trade name "NOCOLOK FLUX" is used as fluoride-based flux.

Synthetic resin possesses fluidity at room temperature, depolymerizes at a temperature lower than brazing temperature (about 600° C.), and sublimes completely. For example, polybutene or acrylic acid-based resin, such as butyl acrylate, is used as synthetic resin. For example, polybutene having a mean molecular weight of 200 to 2500 can be used. The polybutene sublimes substantially completely at 450° C. and leaves no residue.

The amount of fluoride-based flux added to synthetic resin is set to 40 to 70 wt. %. The reason for this is that, when the amount of flux falls within this range, there can be produced the flux 40 which has viscosity enabling stable adherence to the paint roller or the application belt and a transfer region on the surface of the aluminum material without losing fluidity and which can ensure the amount of flux sufficient for brazing even when transferred in a small amount.

Figure 6:
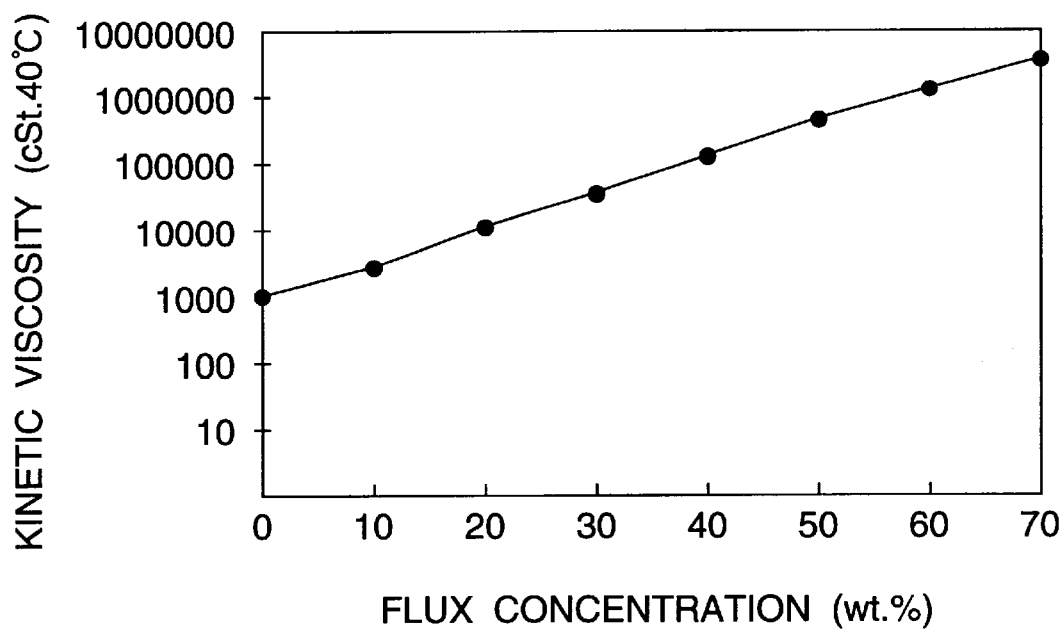
FIG. 6 is graph showing a relationship between the concentration of the fluoride-based flux included in synthetic resin and the kinetic viscosity of synthetic resin doped with the flux.

FIG. 6 shows the relation between fluoride-based flux concentration (wt. %; hereinafter referred as "flux concentration") and kinetic viscosity (cSt. 40° C.) when the fluoride-based flux is added to polybutene having a mean molecular weight of 1000, for various concentrations of the fluoride-based flux. The kinetic viscosity is increased with an increase in flux concentration, and a kinetic viscosity of 100000 cSt. (at 40° C.) can be obtained at a flux concentration of 40 wt. %. Even when fluoride-based flux becomes highly viscous at an excessive flux concentration of 50 wt. %, fluoride-based flux can be readily dispersed uniformly in synthetic resin through use of an electric agitator having stirring vanes.

The flux 21 having a kinetic viscosity of 100000 cSt. (at 40° can be applied to the paint roller or the application belt without losing fluidity. The flux 21 can be stably transferred to the surface of aluminum material.

Figure 3B:
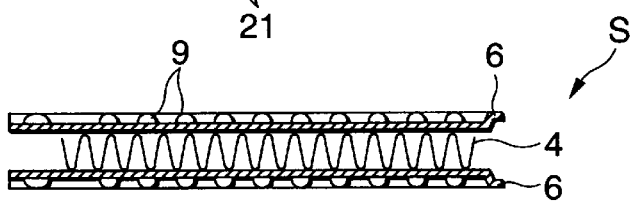

As shown in FIG. 3B, after application of the flux 21 to the outer fin 4, two tube plates 6, 6, which constitute the coolant tube 3, are attached to the respective sides of the outer fin 4 such that the surfaces of the respective tube plates 6, 6 having the dimples 9 formed thereon face inward. Thus, a sandwich unit S is constituted of the outer fin 4 and the tube plates 6, 6.

Figure 3C:
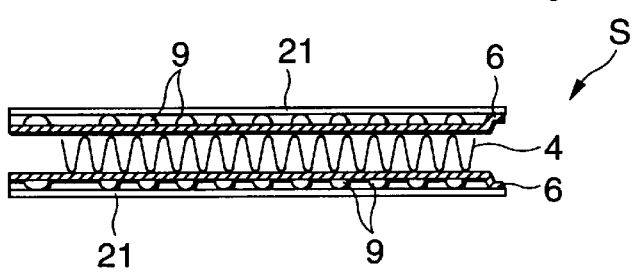

As shown in FIG. 3C, the butt bead faces on the lands 7 and the dimples 9 provided on the surfaces of the respective tube plates 6, 6 of the sandwich unit S are coated with the slime-like flux 21 in the same manner as the outer fin 4.

Figure 3D:
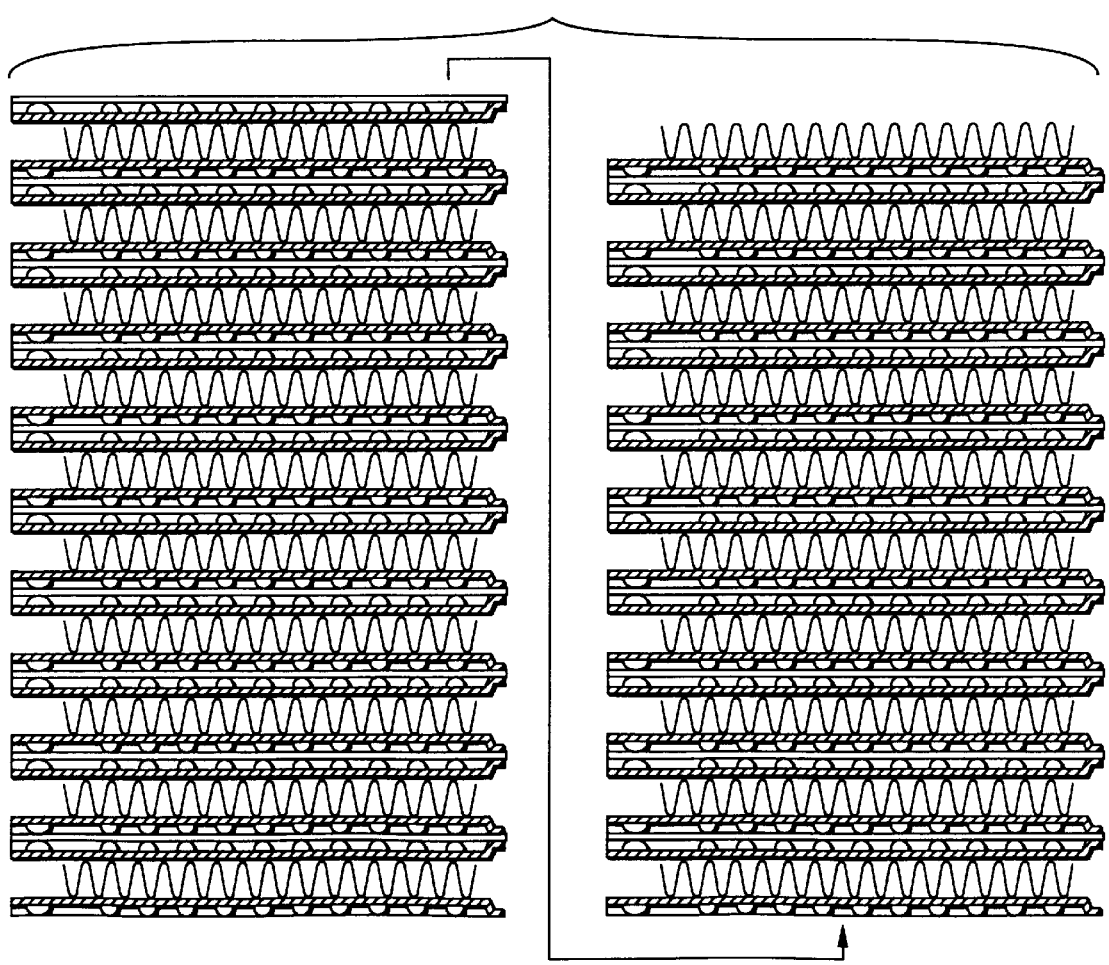

As shown in FIG. 3D, a plurality of the sandwich units S whose tube plates 6, 6 are coated with flux are stacked into a layer (the outermost outer fins 4 on the respective ends of the core 2 are covered with end plates 20). This assembly is heated in an unillustrated heating furnace, to thereby sublime a dispersion medium of the flux 21, activate the flux 21, and fuse brazing filler metal. As a result, the coolant tubes 3, each comprising the tube plates 6, 6, and the tube plates 6 connected to the outer fin 4 are brazed, thereby constituting the stacked core 2 of required width.

As mentioned above, the method for manufacturing a core of a heat exchanger according to the present invention involves application of the slime-like flux 21 to solely the top peaks of the corrugated outer fins 4 and the butt bead faces on the land sections 7 and the dimples 9. The areas other than those required to be brazed are not coated with the flux 21, thus eliminating waste of the flux 21 and advantageous manufacture of the core at reduced cost.

In a process before the process for forming the sandwich unit S from the outer fin 4 and the tube plates 6, 6, the flux 21 is not applied to the tube plates 6, 6, and hence the tube plates 6, 6 can be handled easily. Even after assembly of the sandwich unit S (see FIG. 3B), the surfaces of the respective tube plates 6, 6 on either side of the sandwich unit S are not coated with the flux 21. Hence, the sandwich unit S can be handled easily, and there can be prevented staining of surrounding facilities, which would otherwise be caused by the flux 21.

The butt bead faces on the lands 7 and the dimples 9 on the respective tube plates 6, 6 of the sandwich unit S are coated with the slime-like flux 21, and the sandwich units S are stacked in a layer (see FIGS. 3C and 3D). There is little chance of the worker touching the flux-coated surfaces of the tube plates 6, 6 on either side of the sandwich unit S, thus preventing scraping off of the flux adhering to the tube plates 6, 6.

Further, as mentioned above, once the sandwich unit S has been constituted of the outer fin 4 and the tube plates 6, 6, the tube plates 6, 6 on respective sides of the sandwich unit S are coated with flux. So long as the sandwich units S are stacked one after another, a core can be constituted by stacking the outer fins 4 and the coolant tubes 3 in an alternating manner, thus improving the efficiency of staking operation and productivity.

In the present embodiment, of the outer fin 4 and the tube plates 6, 6, only the tube plates 6, 6 are formed from clad material, thus realizing further cost reduction.

Figure 7A:
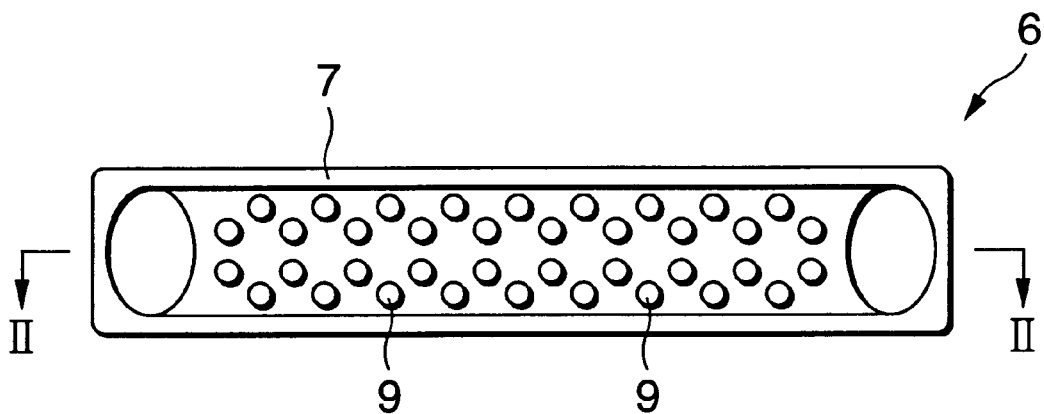
FIG. 7A shows a plan view of another type of a tube plate.
Figure 7B:
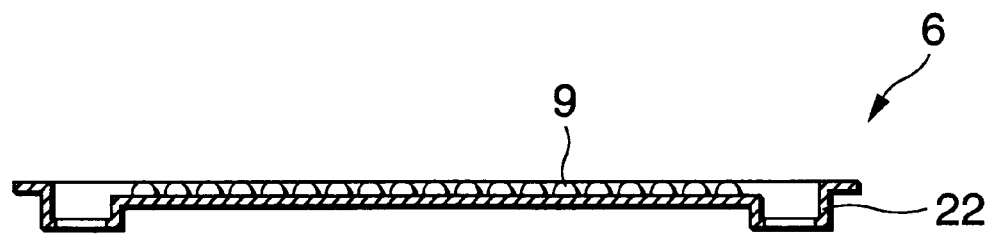
FIG. 7B shows a side sectional view of the tube plate taken along line II—II in FIG. 7A.

Although the previous embodiment has described the heat exchanger comprising a tube seat separate from tanks, the present invention can also be applied to a tube seat integrally formed with tanks as shown in FIGS. 7A and 7B.

Figure 8A:
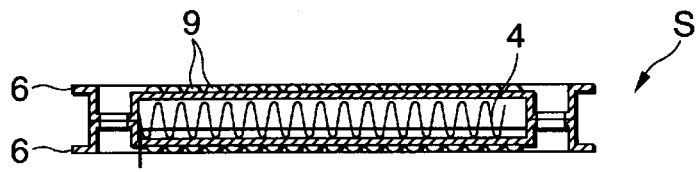
FIGS. 8A to 8C are descriptive views showing a method of manufacturing a core of a heat exchanger according to the present invention.
Figure 8B:
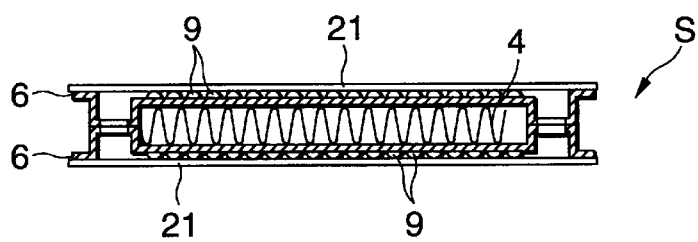
Figure 8C:
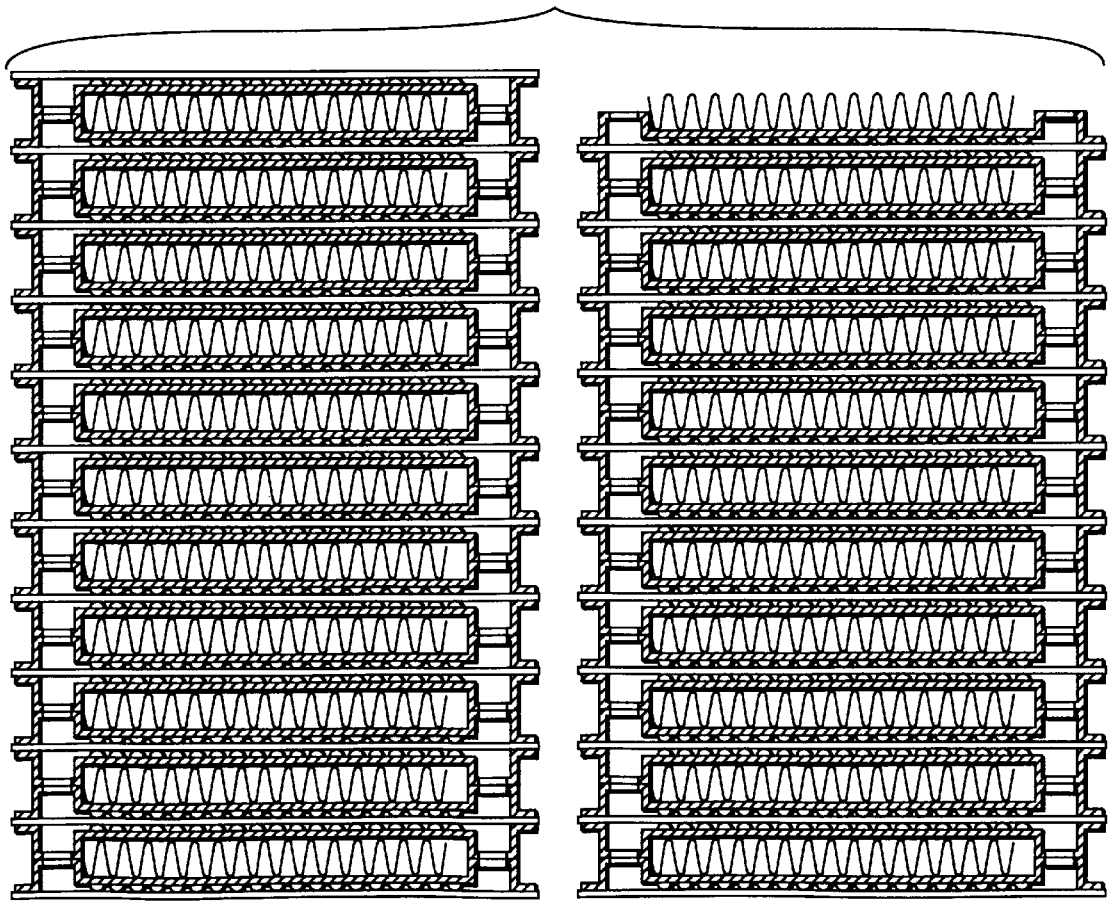

FIG. 7A shows a plan view of another type of a tube plate 6, and FIG. 7B shows a side sectional view of the tube plate taken along line II—II in FIG. 7A. In this tube plate 6, a tank forming portion 22 is integrally formed. FIGS. 8A to 8C are descriptive views showing a method of manufacturing a core of a heat exchanger using the tube plate 6 in FIGS. 7A and 7B. The manufacturing method is same as that of FIGS. 3A to 3D.

Although the invention has been described in its preferred form with a certain degree of particularity, it is understood that the present disclosure of the preferred form can be d arrangement of parts without departing from the spirit and the scope of the invention as hereinafter claimed.

What is claimed is:

1. A method of manufacturing a core for use in a heat exchanger, said method comprising steps of:

coating top peaks of a corrugated outer fin with flux;

attaching two tube plates to both side of said corrugated outer fin so that an outer surface thereof is brought into contact with the top peaks of said corrugated outer fin thereby preparing a sandwich unit comprising said outer fin and said two tube plates;

repeating said coating step and said attaching step so as to prepare a plurality of sandwich units;

coating butt bead surfaces on the tube plates on both sides of said respective sandwich unit with the flux;

stacking said plurality of sandwich units of which tube plates are coated with the flux; and heating stacked sandwich units so as to braze together said tube plates and said outer fins, to thereby manufacture the core for use in the heat exchanger.

2. A method of manufacturing a core for use in a heat exchanger according to claim 1, further comprising a step of forming said tube plate from clad material of which surface is coated with a brazing filler metal.

3. A method of manufacturing a core for use in a heat exchanger according to claim 1, wherein said corrugated outer fin is coated with the flux by means of an endless coating belt extending between rollers.

4. A method of manufacturing a core for use in a heat exchanger according to claim 1, sandwich unit comprising said outer fin and said two tube plates is coated with the flux by means of an endless coating belt extending between rollers.

5. A method of manufacturing a core of a heat exchanger, comprising steps of:

coating top peaks of a corrugated fin with flux;

coating of a specific part to be brazed of a tube plate with flux;

stacking a plurality of the corrugated fins and a plurality of the tube plates each being coated with the flux; and brazing said stuck corrugated fins and said stuck tube plates to thereby manufacture the core of the heat exchanger.

\* \* \* \* \*